United States Patent [19]

Tack et al.

[11] Patent Number: 5,684,093
[45] Date of Patent: Nov. 4, 1997

[54] NITROGEN-CONTAINING COMPOUNDS

[75] Inventors: Robert Dryden Tack, Abingdon, United Kingdom; Jacob Isaac Emert, Brooklyn, N.Y.; Alan R Katritzky; Irina V Shcherbakova, both of Gainesville, Fla.

[73] Assignee: Exxon Chemical Patents Inc, Linden, N.J.

[21] Appl. No.: 454,167

[22] PCT Filed: Dec. 8, 1993

[86] PCT No.: PCT/EP93/03480

§ 371 Date: Sep. 5, 1995

§ 102(e) Date: Sep. 5, 1995

[87] PCT Pub. No.: WO94/13711

PCT Pub. Date: Jun. 23, 1994

[30] Foreign Application Priority Data

Dec. 8, 1992 [GB] United Kingdom .................. 9225620

[51] Int. Cl.$^6$ ........................................ C08F 8/30
[52] U.S. Cl. .............. 525/374; 525/350; 525/359.3; 525/359.5; 525/379; 525/380; 525/381
[58] Field of Search .................. 525/374, 359.5, 525/379, 381, 359.3

[56] References Cited

U.S. PATENT DOCUMENTS

| | | |
|---|---|---|
| 3,190,882 | 6/1965 | Schaeffer . |
| 3,483,141 | 12/1969 | Litt . |
| 3,562,263 | 2/1971 | Litt et al. . |
| 3,681,333 | 8/1972 | Litt . |
| 4,102,798 | 7/1978 | Ryer et al. ........................ 252/51.5 A |
| 4,153,566 | 5/1979 | Ryer et al. ........................ 252/51.5 A |
| 4,608,419 | 8/1986 | Dorman et al. ........................ 525/329.9 |
| 4,816,520 | 3/1989 | Bronstert ........................ 525/285 |

FOREIGN PATENT DOCUMENTS

| | | |
|---|---|---|
| 0 274 021 A1 | 7/1988 | European Pat. Off. . |
| 0 315 151 A2 | 5/1989 | European Pat. Off. . |
| 0 329 891 A2 | 8/1989 | European Pat. Off. . |
| 0 342 792 A1 | 11/1989 | European Pat. Off. . |
| 0 400 871 A1 | 5/1990 | European Pat. Off. . |
| 480 069 | 4/1992 | European Pat. Off. . |
| 1 123 673 | 8/1968 | United Kingdom . |
| 1 147 888 | 4/1969 | United Kingdom . |
| 1 231 409 | 5/1971 | United Kingdom . |
| 1 544 292 | 4/1979 | United Kingdom . |
| WO 91/09064 | 6/1991 | WIPO . |

OTHER PUBLICATIONS

Seymour et al., "Polymer Chemistry", Second Edition, (1992), 467, Marcel Dekker (New York).
W. Seeliger et al., Angew. Chemical International Edition, "Recent Syntheses and Reactions of Cyclic Imidic Esers", 5 (10), pp. 875–888 (1966).
E.S. Levchenko et al., Journal Organic Chemistry USSR, "Synthesis Based on N–Aroylsulfinylamines" 12(2), pp. 432–435. (1976).
D. Ben–Ishai et al., Journal Heterocycl. Chemistry, "The Amidoalkylation of Aromatic Compounds and Olefins with 5–Alkxoyhydantoins 91,2)", 7(6), pp. 1289–1293 (1970).
D. Ben–Ishai et al., Tetrahedron, "A New Synthesis of Amino Acids—II. Amidoalkylation of Olefins with Glyoxylic Acid Derivatives",33(12) pp. 1533–1542, (1977).
C. Giordano et al., Synthesis "5,6–Dihydro–4H–1,3–oxazines from Olefins", Montecatini–Edison, (2), pp. 92–95, (1971).
C. Giordano et al., Gazzetta Chimia Italiana, "5,6–Dihydro–4H–1,3–Oxazines by Polar 1,4–Cycloaddition of Amidoalkyl Ions to Olefins. Configurational and Conformational Nuclear Magnetic Resonance Analysis of the Products", 104 (11–12), pp. 1181–1193 (1974).
L.Simon et al., Acta Chimica Hungarica, "Stereochemical Studies, 80. Cyclic Amino Alcohols and Related Compounds. Preparation of cis–2–(alkylaminomethyl)–and (aralkylaminomethyl)–1–cyclanols from olefins via the 5,6–dihydro–4H–1,3–oxazine derivatives", 118(2), pp. 1319–145 (1985).
Chemical Abstracts No. 83:97317h: G. Ribaldone et al., "Dihydro–1,3–oxazines and derivatives". Ital. 886,285 (Mar. 1, 1971).
Chemical Abstracts No. 86:55459n: C. Giordano, "Dihydro–1,3–oxazines and derivatives", Ital. 927,515 (Sep. 1, 1972).
Chemical Abstracts No. 87:135353j: H. Matsuoka et al., "2–Oxazoline and 5,6–dihydro–4H–1,3–oxazine", Japan, Koka 77–19,660 (Feb. 15, 1977) (see AT below).
Chemical Abstracts No. 66:18690x: W. Seeliger et al., Justus Liebigs Ann. Chem., "Synthesis of 5,6–dihydro–4H–1, 3–oxazines", 697, pp. 171–180 (1966).
Derwent Abstracts No. 22483Y: Mitsui Petrochem. KK, JP52–19,660 (Feb. 15, 1977). (see AR above).
Derwent Abstracts No. 58505R: Sumitomo Chem., JP 7024582 (Aug. 15, 1970).
Revue de l'Institut Francais du Petrole vol. 41, No. 2, Mars–Avril 1986—"Iminoethers–1,3 Cycliques": pp. 275–295 (Translation for Chimie Et Applications Dans Le Domaine . . . see above).
Synthesis International Journal of Methods in Synthetic Organic Chemistry No. 2 (Feb. 1979).

*Primary Examiner*—Fred Zitomer
*Attorney, Agent, or Firm*—K. R. Walton

[57] ABSTRACT

Nitrogen-containing functionalised polymers may be obtained by reacting olefinically-unsaturated polymers and N-substituted amido or imido compounds in the presence of an acid catalyst. The compounds may be useful as oil additives, for example, as dispersants, in lubricating or fuel oil compositions.

$C_2$ to $C_{25}$ olefins may be reacted with N-substituted amido or imido compounds to obtain dihydrooxazine compounds, which may be useful as chemical intermediates.

15 Claims, No Drawings

NITROGEN-CONTAINING COMPOUNDS

FIELD OF THE INVENTION

The invention relates to an improved method for the manufacture of nitrogen-containing compounds. More particularly, the invention relates to an improved method for the manufacture of functionalised polymers suitable for use as lubricating or fuel oil additives or as intermediates suitable for use in the manufacture of such additives, to functionalised polymers obtainable by the said method and to their use. The invention also relates to the manufacture of dihydrooxazines.

BACKGROUND OF THE INVENTION

For the past 30 to 50 years, lubricating oils used as crankcase lubricants in internal combustion engines in automobiles and trucks have normally contained ashless dispersants. Dispersants maintain oil-insoluble substances, resulting from oxidation during use, in suspension in the fluid, thus preventing sludge flocculation and precipitation or deposition on metal parts. So-called ashless dispersants are organic materials which form substantially no ash on combustion, in contrast to metal-containing (and thus ash-forming) detergent. Examples of ashless disperants are the reaction products of amines and/or alcohols, including amino-alcohols, with hydrocarbyl-substituted mono- or dicarboxylic acids, long chain aliphatic hydrocarbons having one or more polyamine molecules attached directly thereto, and Mannich condensation products containing a long chain hydrocarbyl group, for example, as a substituent of a phenol. Crankcase lubricants may in addition, or alternatively, contain viscosity index modifier dispersants (sometimes called multifunctional viscosity modifiers), which have both viscosity index-modifying and dispersant properties. Ashless dispersants and/or viscosity index modifier dispersants are frequently also used in other lubricating oil compositions, an ashless dispersants may also be used in fuels.

One advantageous class of the ashless dispersants mentioned above comprises the hydrocarbyl-substituted dicarboxylic acids or anhydrides and derivatives thereof, the hydrocarbyl substituents of the said acids or anhydrides containing, for example, from 50 to 400 carbon atoms. That class includes especially succinic acid or anhydride having a side chain derived from polyisobutene, the last-mentioned compounds commonly being known as PIBSAs, and their reaction products with alcohols and/or amines, for example, polyamines (PAMs). A previously known process for the manufacture of hydrocarbyl-substituted dicarboxylic acids or anhydrides involves a chlorination step, in which a polyalkene is reacted with chlorine, and an "acidification" step, in which the chlorinated polyalkene is reacted with maleic anhydride. The chlorination and acidification steps may be carried out either simultaneously or sequentially.

The polymer functionalisation step in the above-mentioned process involves the use of chlorine gas, and requires suitable precautions to be taken in handling and disposal.

Other methods known in the art for functionalizing polyolefins involve hydroformylation, iminomethylation, reductive amination and alkylation, each of which require catalysts which necessitate handling precautions.

Amidoalkylation of olefinically-unsaturated compounds has been described in relation to non-polymeric olefins in U.S. Pat. No. 3,190,882, GB-A-1 231 409, GB-A-1 147 888, Perchec et al (Revue de L'Institut Francais du Petrole, Vol. 41, No. 2, 275 to 295) and Zaugg (Synthesis, 1970, 49 to 73), but these documents do not describe the amidoalkylation of olefinically unsaturated polymers to form products which may be useful as a dispersant for lubricants or fuels.

SUMMARY OF THE INVENTION

The present invention provides a method of preparing a functionalised polymer, particularly a functionalised polymer suitable for use as a dispersant or as an intermediate for use in the preparation of a dispersant, comprising reacting, in the presence of an acid catalyst, (i) an olefinically unsaturated polymer of number average molecular weight from 350 to 100,000 and (ii) an acid amide or acid imide of which the amido or imido nitrogen atom, respectively, is substituted by a group —$CHX R^2$ in which X is a group that, under the reaction conditions, acts as a leaving group, and $R^2$ is a hydrogen atom or a hydrocarbyl radical having from 1 to 11 carbon atoms.

The imido or amido group advantageously contains a carbon—carbon double bond in the $\alpha,\beta$-position relative to the carbonyl of the said group.

As acid amide there may advantageously be used a compound of general formula I

$$R^1CONHCHXR^2 \qquad \text{I}$$

in which $R^1$ is a hydrogen atom or a hydrocarbyl radical having from 1 to 12 carbon atoms.

The invention also provides a functionalised polymer comprising a compound of the general formula II' or II"

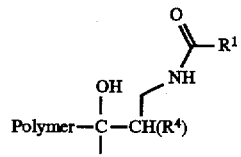

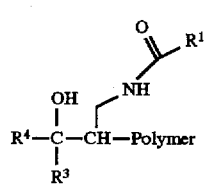

or a compound of the general formula III

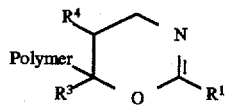

in which $R^1$ is a hydrogen atom or a hydrocarbyl radical having from 1 to 12 carbon atoms, $R^3$ and $R^4$, which may be the same or different, are each hydrogen atoms or hydrocarbyl radicals and Polymer—represents a polymer chain derived from an olefinically unsaturated polymer of number average molecular weight 350 to 100,000.

The invention further provides an oleaginous composition comprising a base oil and, a functionalised polymer obtainable according to a method of the invention.

The product of the reaction of a polymer and an N-substituted amide or imide (referred to hereafter as the "amidoalkylation product" that term being used herein to include those products obtained in accordance with the invention by reaction of an N-substituted imide with an olefinically unsaturated polymer) and derivatives thereof are functionalised polymers which may be useful as additives in lubricating or fuel oil compositions. For use as dispersants in lubricating oil compositions there are preferred functionalised polymers obtained from olefinically unsaturated polymers of $\overline{M_n}$ at least 700 and preferably from 2,000 to 6,000.

Functionalised polymers of the invention for use as dispersants in lubricating oils are preferably those obtainable by reacting the amidoalkylation product with an amine, an aminoalcohol or a thiol.

Functionalised polymers of the invention obtainable from olefinically unsaturated polymers having a $\overline{M_n}$ of from 10,000 to 50,000 may be used as viscosity index-modifying dispersants in lubricating oil compositions. Although functionalised polymers of $\overline{M_n}$ 2,000 to 10,000 useful as dispersants will generally exhibit viscosity index-modifying properties, the amounts of such compounds required to effect the necessary modifications of viscosity index may be appreciable. Accordingly, where functionalised polymers of $\overline{M_n}$ less than 10,000 are included in a lubricating oil composition, an additional viscosity index-improver will generally be desirable.

For use as dispersants in fuels, there are preferred functionalised polymers (which may be either the amidoalkylation product or the derivatives obtainable by reacting that product with an amine, an aminoalcohol or a thiol) obtainable from olefinically unsaturated polymers of $\overline{M_n}$ from 350 to 2,000.

Thus, the invention further provides the use of a functionalised polymer obtainable in accordance with the method of the invention as a dispersant in a lubricating oil or fuel composition.

The invention also provides the use of a functionalised polymer obtainable in accordance with the method of the invention as a viscosity index modifier in a lubricating oil composition.

Number average molecular weights may be determined by available techniques such as gel permeation chromatography. Except where otherwise stated, number average molecular weights referred to herein are measured by gel permeation chromatography.

Whilst the invention is not to be construed as limited by the following explanation, it is thought that the product of the reaction of the olefinically unsaturated polymer and the N-substituted amide or imide contains a major proportion of an amino alcohol. For example, the reaction product of a polymer

Polymer-CR³=CHR⁴ and the N-(hydroxymethyl) amide

CH₂=CHCONHCH₂OH is believed to be an amino alcohol of general formula

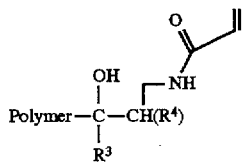

R³ and R⁴, which may be the same or different, each being hydrogen atoms or hydrocarbyl radicals, for example, $C_1$ to $C_6$ hydrocarbyl radicals. It is believed that the product may also contain a polymer-substituted dihydrooxazine, which in the case of the reactants just mentioned might be of general formula III

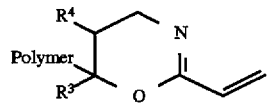

in which R³ and R⁴ have the meanings given above. The polymer-substituted dihydrooxazine, if present, is believed to constitute a minor proportion of the reaction product. The actual proportion may depend on the conditions and, in particular, on the nature, for example, the chain length and/or structure, of the olefinically unsaturated polymer used, and the nature of the acid catalyst used. Other species that might be present are compounds obtainable by elimination of water from the amino alcohol. The invention extends to compounds of the general formula II' or II"

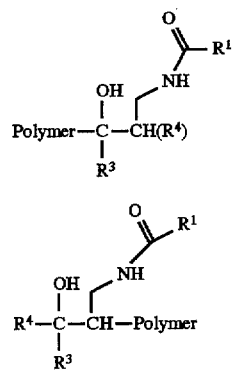

in which $R^1$ is a hydrogen atom or a hydrocarbyl radical having from 1 to 12 carbon atoms, $R^3$ and $R^4$, which may be the same or different, are each hydrogen atoms or hydrocarbyl radicals and Polymer—represents a polymer chain derived from an olefinically unsaturated polymer of number average molecular weight 350 to 100,000; and compounds of general formula III'

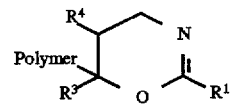

in which $R^1$, $R^3$, $R^4$ and Polymer—have the meanings given in connection with general formula II'; either individually or in combination.

The term "hydrocarbyl" as used herein means that the radical concerned is primarily composed of hydrogen and carbon atoms but does not exclude the presence of other atoms or groups in a proportion insufficient to detract from the substantially hydrocarbon characteristics of the radical concerned. Such radicals include:

(i) Hydrocarbon groups, for example, aliphatic (eg. alkyl or alkenyl), alicyclic (eg. cycloalkyl or cycloalkenyl) and aromatic groups, aromatic groups having aliphatic or alicyclic substituents, and aliphatic and alicyclic groups having aromatic substituents. Examples of hydrocarbon groups include methyl, ethyl, ethenyl, propyl, propenyl, butenyl, cyclohexyl, t-butylphenyl, 2-benzethyl and phenyl groups;

(ii) Substituted hydrocarbon groups, that is, groups having one or more non-hydrocarbon substituents which do not detract from the substantially hydrocarbon characteristics of the group. Examples of suitable non-hydrocarbon substituents include hydroxy, nitrile, nitro, oxo, chloro groups, and groups having ether or thioether linkages; and (iii) Hetero groups, that is, groups containing an atom other than carbon in a chain or ring otherwise composed of carbon atoms, the said atom not detracting from the substantially hydrocarbon characteristics of the group. Nitrogen, oxygen and sulphur may be mentioned as suitable hetero atoms.

The hydrocarbyl radicals preferably contain only one non-hydrocarbon substituent or one non-carbon hetero atom if such substituents or atoms are present.

The olefinically unsaturated polymers that may be used in accordance with the invention preferably include a backbone chain of carbon atoms. They may, if desired, have pendant hydrocarbyl side chains provided that the side chains do not contain nitrogen. The polymers have at least one carbon—carbon double bond, which is adjacent to, or more preferably in, a terminal position of the backbone chain or of a pendant side chain but any pendant side chains are preferable free of other reactive double bonds. The polymers may include one or more substituents or hetero atoms as defined above in relation to the term "hydrocarbyl" on or in the polymer chain that do not interfere with the reaction—thus they should not contain nitrogen.

Suitable polymers include those obtainable by polymerisation (including copolymerisation) of lower molecular weight olefins, for example, olefins having up to eight carbon atoms, or derivatives of such olefins. For example, the polymer may be one obtainable by polymerisation of an olefin selected from ethene, propene, n-butene, isobutene, butadiene, and 1-hexene or by copolymerisation of two or more olefins, for example, by copolymerisation of ethene and an α-olefin. The polymer is advantageously one that is obtainable by polymerisation of n-butene or isobutene. Suitable copolymers include, for example, those obtainable by copolymerisation of ethene and propene. A suitable diene may be used as a copolymer in a molar proportion that is so chosen that the polymer has a desired proportion of pendant double bonds with which the N-substituted amide or imide may react. For example, when Ziegler-Natta catalysis, is used to prepare the polymer, ethylidene-norbornene may be used. Other suitable dienes are well-known to those skilled in the art.

The polymers may especially be obtainable by Ziegler-Natta catalysis, for example using a vanadium/aluminium Ziegler-Natta catalyst system, metallocene catalysis, cationic catalysis, anionic catalysis or free radical polymerisation. Suitable methods, having regard to the monomers to be used and the desired chain length, will be immediately apparent to those skilled in the art.

The group $R^1$ of the amide of general formula I is advantageously a hydrocarbyl group having from 1 to 12, and preferably from 2 to 8, carbon atoms. Preferably, $R^1$ is a hydrocarbyl group that has a carbon—carbon double bond in the α,β position with respect to the carbonyl group of the amide I, as that results in the presence of the carbonyl group and an adjacent C=C group (—C=C—CO—) in the reaction product. That is advantageous in that it facilitates the introduction in a subsequent reaction step of other groups at the double bond, for example, by means of Michael addition. $R^1$ may advantageously be an aliphatic hydrocarbyl group. In an especially preferred embodiment of the invention, $R^1$ is an alkenyl group having a carbon—carbon double bond adjacent to the carbonyl group.

$R^1$ may be an aromatic group, for example a phenyl group.

As suitable N-substituted amides there may be mentioned N-substituted acrylamides, methacrylamides, crotonamides, benzamides, and cinnamamides.

Suitable N-substituted imides for use in the method of the invention include in particular those having a carbon—carbon double bond adjacent to the carbonyl of the imido group. Examples of suitable N-substituted imides are maleimide and methylmaleimide.

In its broadest aspect, the invention also includes the use of amides of dicarboxylic acids, for example, fumaric amide or diamide and itaconamide.

As already mentioned, $R^2$ of the amide of general formula I is a hydrogen atom or a hydrocarbyl group having from 1 to 11 carbon atoms. Preferably, $R^2$ is a hydrogen atom.

The group X is any group which, under the reaction conditions, may act as a leaving group. For example, the group X may be selected from hydroxy, hydrocarbyloxy (preferably alkoxy, aryloxy, aralkyloxy or alkaryloxy) and amido groups which do not contain any aliphatic unsaturation. Preferably, X is a hydroxy, aryloxy or amido group. If the reaction is to be carried out in an anhydrous medium, X is preferably an amido group.

While the amide of general formula I is preferably prepared in a separate step before it is mixed with the polymer, it may, if desired, be prepared in situ by reacting two or more precursor compounds to form the amide. For example, in an aqueous acidic environment, formaldehyde reacts with a nitrile or an amide to form an N-(hydroxymethyl)amide. An N-(hydroxymethyl)amide may, be generated in situ by hydrolysis of an N, N", N'"-triacyl triazine of which the acyl groups are of the formula $R^1CO$—, in which $R^1$ has the meaning given above.

The imido or amido compound is advantageously present in molar excess, for example, from two- to ten-fold and, preferably, up to a five-fold molar excess, with respect to the olefinically unsaturated polymer.

The acid catalyst used in the method of the invention preferably has a $pK_a$ of 3 or less, most preferably 0 or less and may be a mineral acid, an organic acid or a Lewis acid. Examples of suitable mineral acids are sulphuric acid and phosphotungstic acid. Acid clay may also be used. Preferably, very strong acids are avoided as they may lead to undesirable side reactions. Thus Lewis acids are preferably used in combination with weaker acids.

Examples of suitable organic acids are acetic acid, trifluoroacetic acid, p-toluenesulphonic acid and methanesulphonic acid and acidic ion exchange resins, for example, Amberlyst 15 (obtainable from Rohm and Haas).

The acid catalyst may be present in a catalytic amount. It may be desirable in some cases for the acid catalyst to be present in an amount greater than that required merely to catalyse the reaction, for example, where the acid acts also as a solvent or is required to form a salt with the reaction product. In such cases, the acid may be present in a stoichiometric amount or in molar excess, with respect to the olefinically unsaturated polymer.

In one preferred method of the invention, the olefinically unsaturated polymer is mixed with the amide in the presence of acetic acid and sulphuric acid. In the most preferred method of the invention, however, trifluoroacetic acid is used as the acid catalyst. In that case, the trifluoroacetic acid may also act as, or as a component of, the solvent and may, if desired, be recovered from the reaction mixture and recycled, so that the method is economical in terms of materials.

It is a further advantage of the method of the invention that the reaction may, if desired, be carried out in the presence of water whereas, in contrast, the catalysts used in certain previously known polymer functionalisation methods are sensitive to water. Whilst water-sensitive catalysts may, with appropriate choice of conditions, be used in the method of the invention, they are less preferred than catalysts that may be used in an aqueous environment.

The amidoalkylation product manufactured in accordance with the method of the invention may be hydrolysed, for example, by refluxing in aqueous-ethanol alkaline solutions, in aqueous acid solutions, or in alcoholic KOH in methyl isobutylketone. If the product is obtainable from an $\alpha,\beta$-unsaturated amido or imido compound, for example from an N-substituted acrylamide or maleimide, it may advantageously be reacted with an amine, an amino alcohol or a thiol.

Amine compounds useful for reacting with the product include mono- and (preferably) polyamines, most preferably polyalkylene polyamines, having about 2 to 60, preferably 2 to 40 (e.g., 3 to 20), total carbon atoms and about 1 to 12, preferably 3 to 12, and most preferably 3 to 9 nitrogen atoms in, the molecule. These amines may be hydrocarbyl amines or may be hydrocarbyl amines including other groups, e.g, hydroxy groups, alkoxy groups, amide groups, nitrile groups, or imidazoline groups. Hydroxyl amines with 1 to 6 hydroxy groups, preferably 1 to 3 hydroxy groups, are particularly useful. Preferred amines are aliphatic-saturated amines, including those of the general formulas:

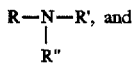

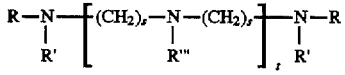

wherein R, R', R" and R"' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R"' can additionally comprise a moiety of the formula:

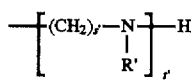

wherein R' is as defined above, and wherein s and s' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To facilitate reaction, it is preferred that R, R', R", R"', s, s', t and t' be selected in a manner sufficient to provide the compounds of formulas IV and V with typically at least one primary or secondary amine group, preferably at least two primary or secondary amine groups. This can be achieved by selecting at least one of said R, R', R" or R"' groups to be hydrogen or by letting t in formula V be at least one when R"' is H or when the moiety of formula VI possesses a secondary amino group. The most preferred amine of the above formulas are represented by formula V and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; poly ethylene amines for example diethylene triamine, triethylene tetramine, and tetraethylene pentamine; poly propylene amines, for example, 1,2- propylene diamine, di-(1,2-propylene)-triamine, and di(1,3- propylene) triamine; N,N-dimethyl-1, 3-diaminopropane; N,N- di-(2-aminoethyl) ethylene diamine; N,N-di(2-hydroxyethyl)-1,3-propylene diamine; 3-dodecyloxypropylamine; N-dodecyl-1,3-propane diamine; trishydroxymethylaminomethane (THAM); diisopropanol amine; diethanol amine; triethanol amine; mono-, di-, and tri-tallow amines; amino morpholines, for example N-(3-aminopropyl) morpholine; and mixtures thereof.

Other useful amine compounds include: alicyclic diamines, for example 1,4-di(aminomethyl)cyclohexane, and heterocyclic nitrogen compounds, for example imidazolines, and N-aminoalkylpiperazines of the general formula

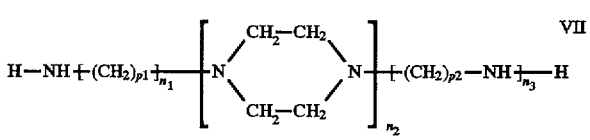

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl-imidazoline and N-(2-aminoethyl)piperazine. Commercial mixtures of amine compounds may advantageously be used. For example, one process for preparing alkylene amines involves the reaction of an alkylene dihalide (for example, ethylene dichloride or propylene dichloride) with ammonia, which results in a complex mixture of alkylene amines wherein pairs of nitrogens are joined by alkylene groups, forming such compounds as diethylene triamine, triethylene tetramine, tetraethylene pentamine and isomeric piperazines. Low cost poly(ethyleneamine) compounds averaging about 5 to 7 nitrogen atoms per molecule are available commercially, for example under the trade names "Polyamine H", "Polyamine 400", and "Dow Polyamine E-300".

Useful amines also include polyoxyalkylene polyamines, for example those of the formulas:

where m has a value of about 3 to 70 and preferably 10 to 35; and

where n has a value of about 1 to 40 with the provision that the sum of all the n's is from about 3 to about 70 and preferably from about 6 to about 35, and R is a polyvalent saturated hydrocarbon radical of up to ten carbon atoms wherein the number of substituents on the R group is represented by the value of a, which is a number of from 3 to 6. The alkylene groups in either formula VIII or IX may be straight or branched chains containing about 2 to 7, and preferably about 2 to 4 carbon atoms.

The polyoxyalkylene polyamines of formulas VIII or IX above, preferably polyoxyalkylene diamines and polyoxyalkylene triamines, may have average molecular weights ranging from about 200 to about 4,000, and preferably from about 400 to about 2,000. The preferred polyoxyalkylene polyamines include the polyoxyethylene and polyoxypropylene diamines and the polyoxypropylene triamines having average molecular weights ranging from about 200 to 2,000. The polyoxyalkylene polyamines are commercially available and may be obtained, for example, from the Jefferson Chemical Company, Inc. under the trade name "Jeffamines D-230, D-400, D-1000, D-2000, T-403", etc.

Still other classes of amines capable of yielding functionalised polymers having dispersant activity comprise the amino alcohols including, for example, aminoalkylene-, and aminoarylene-substituted alcohols having one or more aminoalkylene or aminoarylene radicals.

Hydroxy amines which can be reacted with the product obtained according to the method of the invention to form dispersants include 2-amino-1-butanol, 2-amino-2-methyl-1-propanol, p-(beta-hydroxyethyl)aniline, 2-amino-1-propanol, 3-amino-1-propanol, 2-amino-2-methyl-1,3-propanediol, 2-amino-2-ethyl-1,3-propanediol, N-(beta-hydroxy-propyl)-N'-(beta-aminoethyl)piperazine, amino-1-butanol, ethanolamine, and beta-(beta-hydroxyethoxy) ethylamine. Mixtures of these or similar amines can also be employed. The above description of nucleophilic reactants suitable for reaction with the amidoalkylation product includes amines and compounds of mixed amine and hydroxy containing reactive functional groups, i.e., aminoalcohols.

Suitable thiols include those having one or more thiol group that is suitable for attaching the thiol molecule at the carbon—carbon double bond of the amidoalkylation product, for example, by Michael addition. The thiols preferably also contain hydroxyl and/or amino groups, which by virtue of the resulting polarity impart dispersant activity to the product. For example, tris(hydroxymethyl)methanethiol may be used.

The amidoalkylation product obtained in accordance with the method of the invention, for example, the hydroxyacrylamido polymer, is readily reacted with the amine, aminoalcohol or thiol by heating a solution of said compound and the amidoalkylation product in a suitable solvent, for example, oil.

The functionalised polymers (that is, the amidoalkylation products and their derivatives) manufactured in accordance with the invention for use as lubricating oil additives are oil-soluble or (in common with certain of the other additives/referred to below) are dissolvable in oil with the aid of a suitable solvent, or are stably dispersible materials. Oil-soluble, dissolvable, or stably dispersible as that terminology is used herein does not necessarily indicate that the additives are soluble, dissolvable, miscible, or capable of being suspended in oil in all proportions. It does mean, however, that the additives are, for instance, soluble or stably dispersible in oil to an extent sufficient to exert their intended effect in the environment in which the oil is employed. Moreover, the additional incorporation of other additives may also permit incorporation of higher levels of a particular additive, if desired.

The functionalised polymers manufactured in accordance with the present invention can be incorporated into the oil in any convenient way. Thus, they can be added directly to the oil by dispersing or by dissolving them in the oil at the desired level of concentration, typically with the aid of a suitable solvent such, for example, as toluene, cyclohexane, or tetrahydrofuran. Such blending can occur at room temperature or an elevated temperature.

Base oils with which the functionalised polymers may be used include those suitable for use as crankcase lubricating oils for spark-ignited and compression-ignited internal combustion engines, and these may be synthetic or natural base oils.

The lubricating oil base stock conveniently has a viscosity of from 2.5 to 12 cSt ($2.5\times10^{-6}$ to $12\times10^{-6}$ m$^2$/s) and preferably 2.5 to 9 cSt. ($2.5\times10^{-6}$ to $9\times10^{-6}$ m$^2$/s) at 100° C.

The functionalised polymers manufactured in accordance with the present invention may be employed in a lubricating oil composition which comprises lubricating oil, typically in a major proportion, and the functionalised polymers, typically in a minor proportion. In the preferred composition the functionalised polymers are present in a dispersing amount. For example, the composition may contain from 0.1 to 25 parts by weight of functionalised polymer manufactured in accordance with the invention, per 100 parts by weight base oil, and preferably from 0.5 to 8 parts by weight functionalised polymer per 100 parts base oil. Additional additives may be incorporated in the composition to enable it to meet particular requirements. Examples of additives which may be included in lubricating oil compositions are viscosity index improvers, corrosion inhibitors, oxidation inhibitors, friction modifiers, detergents, metal rust inhibitors, anti-wear agents, pour point depressants, and anti-foaming agents.

Some of the above-mentioned additives can provide a multiplicity of effects; thus for example, a single additive may act as a dispersant-oxidation inhibitor.

When lubricating compositions contain one or more of the above-mentioned additives, each additive is typically blended into the base oil in an amount which enables the additive to provide its desired function. Representative effective amounts of such additives, when used in crankcase lubricants, are as follows:

| Additive | Mass % a.i.* (Broad) | Mass % a.i.* (Preferred) |
|---|---|---|
| Viscosity Modifier | 0.01–6 | 0.01–4 |
| Corrosion Inhibitor | 0.01–5 | 0.01–1.5 |
| Oxidation Inhibitor | 0.01–5 | 0.01–1.5 |
| Friction Modifier | 0.01–5 | 0.01–1.5 |
| Detergents/rust inhibitors+ | 0.01–6 | 0.01–3 |
| Anti-wear Agent | 0.01–6 | 0.01–4 |
| Pour Point Depressant | 0.01–5 | 0.01–1.5 |
| Anti-Foaming Agent | 0.001–3 | 0.001–0.15 |
| Mineral or Synthetic Oil Base | Balance | Balance |

*Mass % active ingredient based on the final oil.
+Relatively larger proportions, for example, at least 10 mass % are normally used for marine applications.

When a plurality of additives are employed it may be desirable, although not essential, to prepare one or more additive concentrates comprising the additives (a concentrate sometimes being referred to herein as an additive package) whereby several additives can be added simultaneously to the base oil to form the lubricating oil composition. Dissolution of the additive concentrate(s) into the lubricating oil may be facilitated by solvents and by mixing accompanied with mild heating, but this is not essential. The concentrate(s) or additive package(s) will typically be formulated to contain the additive(s) in proper amounts to provide the desired concentration in the final formulation when the additive package is/are combined with a predetermined amount of base lubricant. Thus, one or more of the functionalised polymers manufactured in accordance with the present invention can be added to small amounts of base oil or other compatible solvents along with other desirable additives to form additive packages containing active ingredients in an amount, based on the additive package, of, for example, from about 2.5 to about 90 mass %, and preferably from about 5 to about 75 mass %, and most preferably from about 8 to about 50 mass % by weight, additives in the appropriate proportions with the remainder being base oil.

The final formulations may employ typically about 10 mass % of the additive-package with the remainder being base oil.

The functionalised polymers of the invention having a $\overline{M}_n$ of from 350 to 2,000 for use as dispersants in fuel oils maybe used especially, for example, in petroleum-based diesel fuels. The functionalised polymers obtainable in accordance with the invention are also applicable to vegetable based fuels, for example, fuels based on derivatives of rapeseed oil, alone or in combination with petroleum-based fuels. Additional additives for improving low temperature and/or other properties, for example, pour point depressants and wax-anti-settling additives may be present. Such additives are in use in the art or known from the literature.

The present invention further provides a method of preparation of a dihydrooxazine comprising reacting, in the presence of trifluoroacetic acid, (i) a $C_2$ to $C_{25}$-olefin; and
(ii) an α,β-unsaturated acid amide or acid imide of which the amido or imido nitrogen atom, respectively, is substituted by a group —CH X $R^2$ in which X is a group that, under the reaction conditions, acts as a leaving group and $R^2$ is hydrogen or a hydrocarbyl radical having from 1 to 12 carbon atoms.

The use of trifluoroacetic acid as a catalyst in the amidoalkylation of olefinic compounds has been found, surprisingly, to give better yields as compared with the use of other acid catalyst systems, for example, sulphuric acid/acetic acid, to catalyse amidoalkylation of the same compounds.

The N-substituted amide or imide may be an amido compound of general formula $R^1CONHCHXR^2$, in which $R^1$ is a hydrogen atom or a hydrocarbyl radical having from 1 to 12 carbon atoms.

Preferably, $R^2$ is a hydrogen atom. The N-substituted compounds. Suitable are, in particular, those N-substituted amides and imides mentioned above in relation to functionalisation of polymers. Preferred N-substituted compounds are acrylamides, methacrylamides, benzamides and crotonamides. The leaving group may be selected from hydroxy, alkoxy, hydrocarbyloxy (especially aryloxy, aralkyloxy and alkaryloxy) and amido groups, and is advantageously a hydroxy, aryloxy or amido group, especially a hydroxy or amido group.

The olefinic compound preferably has a terminal double bond. It is advantageously a compound of general formula $R^{12}(R^{13})C=C(R^{14})H$ in which $R^{12}$, $R^{13}$ and $R^{14}$ may be the same or different and each represents a hydrogen atom or a hydrocarbyl radical having from 1 to 12 carbon atoms, the total number of carbon atoms not exceeding 25 carbon atoms.

Trifluoroacetic acid may be used in molar excess, and may advantageously be, or be a component of, the solvent in which the reaction is carried out. The dihydrooxazines are useful as chemical intermediates. For example, they may be reacted with amines, including primary or secondary amines, for example C1 to C12 amines, or hydrolysed to give amido alcohols.

The following Examples illustrate the invention:

In the Examples, N-(Hydroxymethyl)acrylamide was used as a 48% aqueous solution ("Aldrich" product). N-(Hydroxymethyl)formamide was prepared according to the procedure reported in German Patent No. 1,088,985. Commercially available benzamide, paraformaldehyde and trifluoroacetic acid were used without additional purification. The polymers used have a carbon—carbon double bond in the terminal position or in the vicinity thereof.

EXAMPLES 1 TO 11

Polymer samples—poly-n-butene ("PNB") or ethene-propene copolymer ("EPC")—were reacted with an amidoalkylation agent using one of the Methods A to D described below. In the Examples, the term amidoalkylation agents is to be understood to include reactants that, under the reaction conditions, are converted to amidoalkylation agents. For example, $PhCONHCH_2OH$ may be obtained in situ by using a mixture of benzamide and paraformaldehyde as the amidoalkylation agent.

Method A

A mixture of polymer, amidoalkylation agent and 15 ml trifluoroacetic acid ("TFA") was heated at 70°–75° C. for 1.5 with vigorous stirring. TFA was distilled off under vacuum, and the residue poured into ice-cold 15% aqueous NaOH solution (20 ml) and extracted with chloroform (100 ml×4). The chloroform layer was dried over $MgSO_4$, and the solvent was removed under vacuo. The residue was treated with ether (150 ml), and crystalline unreacted amidoalkylation agent filtered off. The ether solution was dried over $MgSO_4$, the solvent was removed under vacuum, and the viscous residue (~1.2–1.3 g) was isolated.

Method B

A mixture of polymer (0.001 mol) and TFA was stirred at room temperature, and the amidoalkylation agent was added dropwise. The mixture was stirred vigorously at 85° C. for 1 hour and worked up as described in Method A.

Method C

The polymer was dissolved in 20 ml hexanes. To the vigorously stirred solution, a mixture of amidoalkylation agent and TFA was added, and the mixture was heated at 70°–75° C. for 1.5 hours, with vigorous stirring. TFA and hexanes were distilled off under vacuum, and 20 ml ice-cold 15% aqueous NaOH solution was added under vigorous stirring to the residue. A viscous product was extracted with hexanes (100 ml×4). The hexane layer was washed with water and dried over $MgSO_4$ and the solvent was removed under vacuum. The residue was treated with hexanes (150 ml) and left overnight. A crystalline precipitate was filtered off, and the solvent from the filtrate was removed under vacuum at first at 60° C., and then at 110° C. The viscous residue was isolated and dried from hexanes by heating in a vacuum oven at 130° C. for 5 hours.

Method D

The polymer (0.001 mol) was dissolved in 20 ml hexanes and 20 ml TFA. The amidoalkylation agent (0.01 mol) was added dropwise to the stirred solution at room temperature. The mixture was stirred vigorously at 85° C. or 1 hour and worked up as described in Method C.

Table I gives the results of Examples 1 to 11.

TABLE I

| Example | Polymer | $R^1$ | Method | 13CNMR, δ, C=O | Active Ingredient % |
|---|---|---|---|---|---|
| 1 | PNB($\overline{M}_n$ 730) | Ph | A | 168.50 | 87 |
| 2 | PNB($\overline{M}_n$ 730) | $CH_2$=CH | A | 166.46 | 60 |
| 3 | PNB($\overline{M}_n$ 730) | H | B | b | 50 |
| 4 | PNB($\overline{M}_n$ 1710) | Ph | A | 168.46 | 81 |
| 5 | PNB($\overline{M}_n$ 1710) | $CH_2$=CH | A | 166.53 | 63 |
| 6 | EPC | Ph | A | 168.48 | 93 |
| 7 | EPC | $CH_2$=CH | A | 166.45 | 25 |
| 8 | EPC | H | B | b | 58 |
| 9 | PNB($\overline{M}_n$ 2600) | Ph | C |  | 66 |
| 10 | PNB($\overline{M}_n$ 2600) | $CH_2$=CH | C |  | 44 |
| 11 | PNB($\overline{M}_n$ 2600) | H | D |  | 11 | b: The signal is too weak to be noticed.

In the Table, $R^1$ corresponds to hydrocarbyl group $R^1$ of the amide of general formula I. In Examples 1, 4, 6 and 9, the amidoalkylation agent was PhCONHCH$_2$OH, which was generated in situ from benzamide and paraformaldehyde. In Examples 2, 5, 7 and 10, the amidoalkylation agent was N-(hydroxymethyl)acrylamide. In Examples 3, 8 and 11, the amidoalkylation agent was N-(hydroxymethyl)formamide.

The amounts of active ingredient represent the amount of active polymer remaining after removal of impurities from the products obtained according to the Examples. IR spectra exhibited absorptions for the carbonyl group at 1652–1655 cm$^{-1}$ for the products of Examples 1, 4 and 6, at 1670–1672 cm$^{-1}$ for the products of Examples 2, 5 and 7, and at 1676–1684 cm$^{-1}$ for the products of Examples 3 and 8, together, in each case, with a weak hydroxyl absorption at 3200–3300 cm$^{-1}$.

In the case of the products of Examples 1, 4 and 6, the phenyl group was observable in the $^1$H NMR spectra as two multiplets in 2:3 ratio at δ–7.5 and 7.90 and in the $^{13}$C NMR spectra at δ–126.0, 127.8, 130 and 134.0. The carbonyl group was also visible in the $^{13}$C NMR spectra (see Table I). The measured data already mentioned, together with the absence of C=C signals in the $^{13}$C NMR spectra of the products of Examples 1, 4 and 6, indicate the presence in the product of an aminoalcohol.

As may be seen from Table I, Examples 3 and 8 gave low yields of active ingredient. Although the IR spectra included a carbonyl stretching band, no C=O group was observable in the $^{13}$C NMR spectra, suggesting that only small amounts of carbonyl-containing material were present.

The products of Examples 2, 5 and 7 displayed signals for the carbonyl group and signals for the double bond of the acrylamido fragment ($^1$H NMR δ: 5.70–5.90 (dd,1H), 6.10–6.20 (dd, 2H); $^{13}$C NMR, δ: 127.3 and 130.4), suggesting the presence of the acrylamidoalkyl substituted polymer.

The $\overline{M_n}$ values in Table I were determined by gel permeation chromatography comparisons with polyisobutene or with other appropriate standards. The active ingredient determinations were made using column chromatography over a column of silica gel with heptane as eluent and using IR to detect the onset of elution of a polar material.

EXAMPLE 12

Reaction of amidoalkylated poly-n-butene with butylamine

A mixture of 1.2 g of the amidoalkylation product of Example 2 (amidoalkylated PNB derived from PNB of $\overline{M_n}$ 730), 0.02 mol butylamine and 40 ml ethanol was refluxed for 24 hours. Ethanol and excess butylamine were removed under vacuum at 95° C., yielding a residue of 1.2 g (containing 80% active ingredient).

EXAMPLE 13

Reaction of amidoalkylated poly-n-butene with butylamine

Example 12 was repeated except that, instead of the product of Example 2, 1.2 g of the amidoalkylation product of Example 5 (amidoalkylated PNB obtained from PNB of $\overline{M_n}$ 1710) was used. The reaction product contained 78% active ingredient.

EXAMPLE 14

Reaction of amidoalkylated ethene-propene copolymer with butylamine

Example 12 was repeated except that, instead of the product of Example 2, 1.2 g of the amidoalkylation product of Example 7 (amidoalkylated EPC) was used. The reaction product contained 34% active ingredient.

EXAMPLE 15

A mixture of 1.2 g of the amidoalkylation product of Example 10, 1 g butylamine and 40 ml ethanol was refluxed for 24 hours. Ethanol and excess butylamine were removed under vacuum at 100° C., and a viscous light yellow residue (–1.0 g, 56% active ingredient) was isolated.

The $^1$H and $^{13}$C NMR spectra of the products of Examples 12 to 15 indicated that amine addition had occurred at the double bond of the acrylamido fragment. The $^1$HNMR spectra exhibited three triplets for the CH$_2$ groups in the —CH$_2$NHCOCH$_2$NHCH$_2$— fragment arising from amine addition at δ–2.4, 2.6 and 2.9. The $^{13}$C NMR spectra included a signal corresponding to the carbonyl group (δ173.0 to 173.3) and showed the absence of the C=C double bond, which in the starting polymers was observable in the $^{13}$CNMR spectrum at δ–109.2 and 150.4 for the PNB of $\overline{M_n}$ 730, at δ–109.3 and 150.3 for the PNB of $\overline{M_n}$ 1710 and at δ–106.4 and 109.6 for the EPC. Carbonyl absorptions were also observed at 1653–1654 cm$^{-1}$ in the IR spectra of the products of Examples 12 to 15.

$^1$H and $^{13}$C NMR spectra of the products of Examples 1 to 15 were recorded on a Varian VXR 300, spectrometer (at 300 and 75 MHz, respectively), using CDCl$_3$ as solvent and tetramethylsilane as internal reference. IR spectra were recorded on a Perkin Elmer 1600 FT-IR Spectrometer in CHCl$_3$ solutions, using a CaF$_2$ cell.

The products of Examples 1 to 15 can be dissolved in a base oil, to give concentrates suitable for imparting dispersant properties to oleaginous compositions.

In Example 16 and Comparative Examples A to C, the effectiveness of TFA as catalyst was compared with sulphuric acid/acetic acid in amidoalkylation of a number of olefins.

EXAMPLE 16

A mixture of olefin (0.01 mol), an amidoalkylating agent (0.01 mol) and 10 ml TFA was heated 70° C. for 1 hour with vigorous stirring. TFA was distilled off under vacuum and the residue poured onto ice-cold 15% aqueous NaOH solution (20 ml) and extracted with ether (2×30 ml). The ether layer Was dried over MgSO$_4$ and the solvent removed under vacuum.

COMPARATIVE EXAMPLE A

A mixture of benzamide (0.01 mol), paraformaldehyde (0.01 mol) and the olefin (0.01 mol) was stirred in 10 ml of glacial acetic acid over 10 minutes at room temperature, and a mixture of 12.5 ml of glacial acetic acid and 1.5 ml of 98% sulphuric acid was added dropwise at 10°–15C. for 10 minutes. The mixture was stirred at 65°–70° C. for 1 hour and poured into ice-water (50 ml). It was washed with ether (30 ml×2), neutralised with 25% aqueous sodium carbonate solution to pH7–7.5 while stirring vigorously, and extracted with ether (30 ml×2). The ether layer was dried (MgSO$_4$), and the solvent removed under vacuum.

COMPARATIVE EXAMPLE B

A mixture of olefin (0.01 mol), N-(hydroxymethyl)-acrylamide (0.01 mol) and glacial acetic acid (10 ml) was stirred at 50° C. for 10 minutes, and a mixture of 12 ml glacial acetic acid and 2.5 ml 98% sulphuric acid was added dropwise over 10 minutes. The mixture was stirred at 70° C. for 1 hour and worked-up as described in Comparative Example A.

COMPARATIVE EXAMPLE C

A mixture of acrylamide (0.01 mol) and paraformaldehyde (0.01 mol) in 12.5 ml glacial acetic acid and 1.5 ml 98% sulphuric acid was heated at 70° C. for 10 minutes under vigorous stirring and the olefin (0.01 mol) was added dropwise over 10 minutes. The mixture was stirred at 80°–85° C. for 30 minutes and worked-up as described in Comparative Example A.

Table II compares the yields obtained on amidoalkylation of olefins $R^{12}(R^{13})C=C(R^{14})H$ using as amidoalkylation, agent compounds $R^{11}CONCHCH_2OH$, in which $R^{11}$ is Ph or $CH=CH_2$, using TFA (Example 16), and sulphuric acid/acetic acid (Comparative Examples A, B and C).

Yields of other oxazine products obtained in accordance with the method of Example 16 are given in Table III.

TABLE II

| $R^{12}$ | $R^{13}$ | $R^{14}$ | $R^{11}$ | Comparative Example Yield % | Ex. 16 |
|---|---|---|---|---|---|
| H | H | $(CH_2)_5Me$ | Ph | 50 (A) | 65 |
| H | H | $(CH_2)_5Me$ | $CH=CH_2$ | 62 (B) 52 (C) | 74 |
| H | Me | $CH_2CMe_3$ | $CH=CH_2$ | 65 (B) 68 (C) | 75 |
| —$(CH_2)_4$— | | H | $CH=CH_2$ | 62 (B) 55 (C) | 72 |
| * { $(CH_2)_3Me$ Me | Me $(CH_2)_3Me$ | H H | $CH=CH_2$ $CH=CH_2$ } | 58 (C) | 63 |

*designates a mixture of the two isomers indicated.

TABLE III

| $R^{12}$ | $R^{13}$ | $R^{14}$ | $R^{11}$ | Yield % |
|---|---|---|---|---|
| H | H | $(CH_2)_5Me$ | H | 50 |
| H | Me | $CH_2CMe_3$ | H | 53 |
| —$(CH_2)_4$— | | H | H | 50 |

We claim:

1. A method of preparing an amidoalkylated polymer product comprising reacting, in the presence of an acid catalyst,
   (i) an olefinically unsaturated polymer having a carbon—carbon backbone and a number average molecular weight of from 700 to 100,000 and
   (ii) an acid amide or acid imide of which the amido or imido nitrogen atom, respectively, is substituted by a group —$CHXR^2$ in which X is a hydroxy, hydrocarbyloxy or amido group free from aliphatic unsaturation and $R^2$ is a hydrogen atom or a hydrocarbyl radical having from 1 to 11 carbon atoms.

2. A method of claim 1, in which the acid amide is of general formula I $$R^1CONHCHXR^2 \qquad I$$

in which $R^1$ is a hydrogen atom or a hydrocarbyl radical having from 1 to 12 carbon atoms.

3. A method as claimed in claim 2, wherein $R^1$ is a hydrocarbyl radical that has a carbon—carbon double bond in the α,β-position with respect to the carbonyl of the amide group.

4. A method as claimed in any one of claims 1 to 3, wherein the acid amide is an acrylamide.

5. A method as claimed in any one of claims 1 to 3, wherein the N-substituted amide or imide is generated in situ by reacting together two or more compounds.

6. A method as claimed in claim 1, wherein the acid amide is N-(hydroxymethyl)acrylamide, N-(hydroxymethyl)methacrylamide or N-(hydroxymethyl) crotonamide.

7. A method as claimed in claim 1, wherein the acid catalyst is trifluoroacetic acid.

8. A method as claimed in claim 1, wherein the product of said reaction of an olefinically unsaturated polymer and an acid amide or acid imide compound is (a) hydrolysed; or (b) reacted with an amine, aminoalcohol or thiol.

9. A composition comprising a functionalized polymer of the general formula II or II"

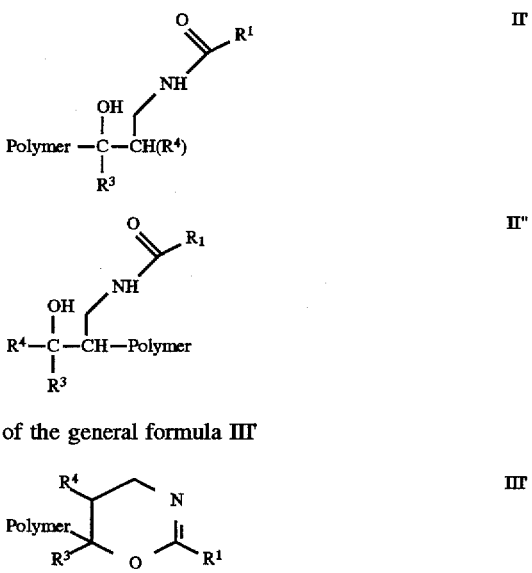

or of the general formula III in which $R^1$ is a hydrogen atom or a hydrocarbyl radical having from 1 to 12 carbon atoms, $R^3$ and $R^4$, which may be the same or different, are each hydrogen atoms or hydrocarbyl radicals and Polymer—represents a polymer chain derived from an olefinically unsaturated polymer having a carbon—carbon backbone and a number average molecular weight of from 700 to 100,000.

10. An oleaginous composition comprising a base oil and a functionalised polymer as prepared by a process as claimed in claim 1.

11. A composition as claimed in claim 9, wherein the olefinically unsaturated polymer from which Polymer—is derived comprises a polymer obtained by polymerization of at least one olefin having up to eight carbon atoms.

12. A composition as claimed in claim 9, further comprising a base oil.

13. A method as claimed in claim 1, wherein the olefinically unsaturated polymer comprises a polymer obtained by polymerization of at least one olefin having up to eight carbon atoms.

14. A method as claimed in claim 8, wherein the product is reacted with (b), wherein (b) is an amine.

15. A method as claimed in claim 14, wherein the amine comprises a polyalkylene polyamine having about 2 to 60 total carbon atoms and 3 to 12 nitrogen atoms in the molecule.

* * * * *